United States Patent
Deng et al.

(10) Patent No.: US 9,834,168 B2
(45) Date of Patent: Dec. 5, 2017

(54) SIDE AIRBAG INCLUDING FORWARD FACING VENT

(71) Applicant: Ford Global Technologies, LLC, Dearborn, MI (US)

(72) Inventors: Zhibing Deng, Northville, MI (US); Deepak Patel, Canton, MI (US); Eric D. Veggian, Superior Township, MI (US); Sean B. West, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/132,303

(22) Filed: Apr. 19, 2016

(65) Prior Publication Data

US 2017/0072898 A1 Mar. 16, 2017

Related U.S. Application Data (60) Provisional application No. 62/219,336, filed on Sep. 16, 2015.

(51) Int. Cl.
| | |
|---|---|
| *B60R 21/239* | (2006.01) |
| *B60R 21/207* | (2006.01) |
| *B60R 21/231* | (2011.01) |
| *B60R 21/237* | (2006.01) |
| *B60R 21/00* | (2006.01) |
| *B60R 21/235* | (2006.01) |

(52) U.S. Cl.
CPC .......... *B60R 21/239* (2013.01); *B60R 21/207* (2013.01); *B60R 21/237* (2013.01); *B60R 21/23138* (2013.01); *B60R 2021/0006* (2013.01); *B60R 2021/0032* (2013.01); *B60R 2021/23146* (2013.01); *B60R 2021/23538* (2013.01)

(58) Field of Classification Search
CPC ............ B60R 21/239; B60R 21/23138; B60R 21/207; B60R 2021/23146
See application file for complete search history.

(56) References Cited

U.S. PATENT DOCUMENTS

| 5,536,038 A | 7/1996 | Bollaert et al. |
| 6,457,741 B2 * | 10/2002 | Seki ...................... B60R 21/207 280/730.2 |

(Continued)

FOREIGN PATENT DOCUMENTS

| JP | 2004106711 A | 4/2004 |
| JP | 2012096781 A | 5/2012 |

OTHER PUBLICATIONS

Kim et al., Airbag in which vent hole is formed, May 24, 2012, JPO, JP 2012-096781 A, Machine Translation of Description.*
UK Search Report dated Mar. 15, 2017 (3 pages).

*Primary Examiner* — James A English
(74) *Attorney, Agent, or Firm* — Frank A. MacKenzie; Bejin Bieneman PLC (57) ABSTRACT

An airbag includes a first panel having a perimeter, and a second panel connected to the first panel along the perimeter of the first panel. The first panel and the second panel define an inflation chamber between the first and second panels. The first panel has a tab extending from the perimeter of the first panel and transverse to the perimeter of the first panel. The tab is connected to the second panel. A vent on the tab is in communication with the inflation chamber.

9 Claims, 10 Drawing Sheets

(56) References Cited

U.S. PATENT DOCUMENTS

| | | |
|---|---|---|
| 6,932,386 B2 | 8/2005 | Ikeda et al. |
| 6,976,702 B2 | 12/2005 | Yokota et al. |
| 7,240,918 B2 | 7/2007 | Yamada et al. |
| 8,123,248 B2 | 2/2012 | Yamane |
| 8,186,708 B2 | 5/2012 | Zhou et al. |
| 8,414,023 B2 * | 4/2013 | Naganawa ............ B60R 21/203 280/739 |
| 8,727,375 B2 | 5/2014 | Suzuki |
| 9,145,102 B2 * | 9/2015 | Fujiwara ........... B60R 21/23138 |
| 9,327,673 B2 * | 5/2016 | Fukawatase .......... B60R 21/239 |
| 2008/0106128 A1 | 5/2008 | Kashiwagi |
| 2009/0224520 A1 * | 9/2009 | Higuchi ................ B60R 21/239 280/740 |
| 2014/0265277 A1 * | 9/2014 | Iida ................... B60R 21/23138 280/743.1 |
| 2015/0061267 A1 | 3/2015 | Deng et al. |
| 2015/0097359 A1 * | 4/2015 | Rickenbach .......... B60R 21/231 280/729 |
| 2015/0183393 A1 * | 7/2015 | Kino .................... B60R 21/207 280/729 |
| 2015/0183394 A1 * | 7/2015 | Yuki ........................ D05B 1/26 280/730.2 |
| 2015/0321638 A1 * | 11/2015 | Sugimoto ......... B60R 21/23138 280/729 |
| 2017/0072899 A1 * | 3/2017 | Deng ................... B60R 21/239 |

\* cited by examiner

SIDE AIRBAG INCLUDING FORWARD FACING VENT

CROSS-REFERENCE TO RELATED APPLICATIONS

The subject patent application claims priority to and all the benefits of U.S. Provisional Patent Application No. 62/219,336 filed on Sep. 16, 2015, which is herein incorporated by reference in its entirety.

BACKGROUND

Side airbags of a vehicle may be deployable between an occupant and a door of the vehicle. The side airbag may be supported by a seat back of the vehicle. Specifically, in an uninflated position, the side airbag may be folded behind upholstery of the seat back, and may extend through the upholstery when inflated to an inflated position.

The side airbags may include vents to provide desired impact absorbing characteristics of the side airbag. The location of the vents that provides for desired impact absorbing characteristics may be subject to competing design factors. Accordingly, there remains an opportunity to design an improved side airbag with desired venting.

DETAILED DESCRIPTION

With reference to the Figures, wherein like numerals indicate like parts throughout the several views, an airbag 10, 210, 310 for a vehicle 12 includes a first panel 14, 314 and a second panel 16, 216, 316. The first panel 14, 314 includes a perimeter P1 and the second panel 16, 216, 316 is connected to the first panel 14, 314 along the perimeter P1 of the first panel 14, 314 defining an inflation chamber 34 between the first panel 14, 314 and the second panel 16, 216, 316. The first panel 14, 314 has a tab 22 extending from perimeter P1 of the first panel 14, 314 transverse to the perimeter P1 of the first panel 14, 314. A vent 24, 25 is on the tab 22 and in communication with the inflation chamber 34.

Since the vent 24, 25 is on the tab 22, instead of at a seam 26, the shape of the vent 24, 25 is maintained when the airbag 10, 210, 310 is inflated during a vehicle 12 impact, as set forth further below. In addition, the location of the vent 24, 25 on the tab 22 allows for design of the vent 24, 25 in any one of a variety of shapes. In addition, the designed location of the vent 24, 25 may be easily moved along two axes X, Y, e.g., a horizontal axis and a vertical axis. Thus, the shape of the vent 24, 25 and the location of the vent 24, 25 along the two axes X, Y may be optimized to encourage proper venting and to minimize blockage of the vent 24, 25 during impact of the vehicle 12 and inflation of the airbag 10, 210, 310.

Figure 1:
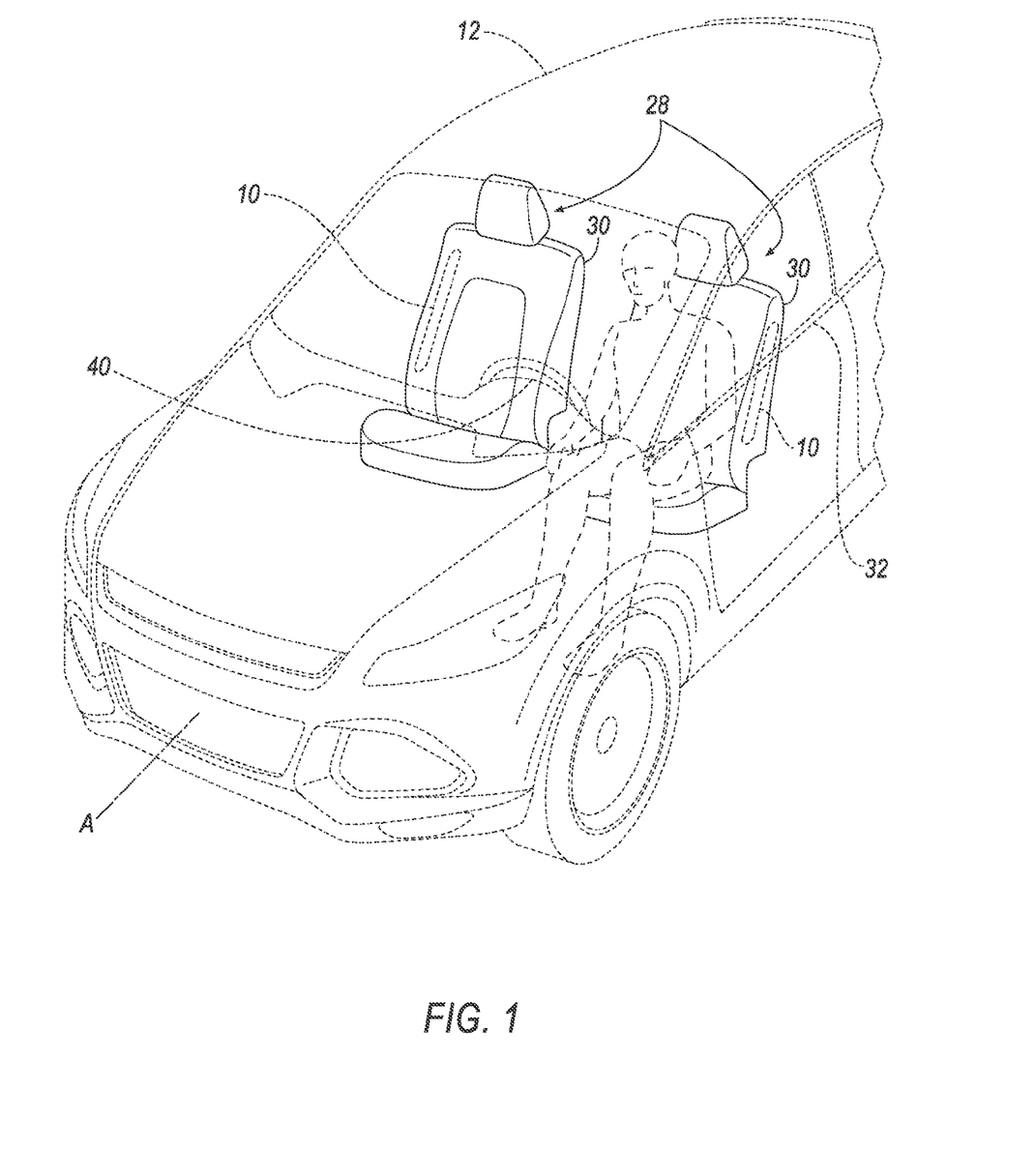
FIG. 1 is a perspective view of a vehicle with two side airbags shown in hidden lines in an uninflated position.
Figure 2:
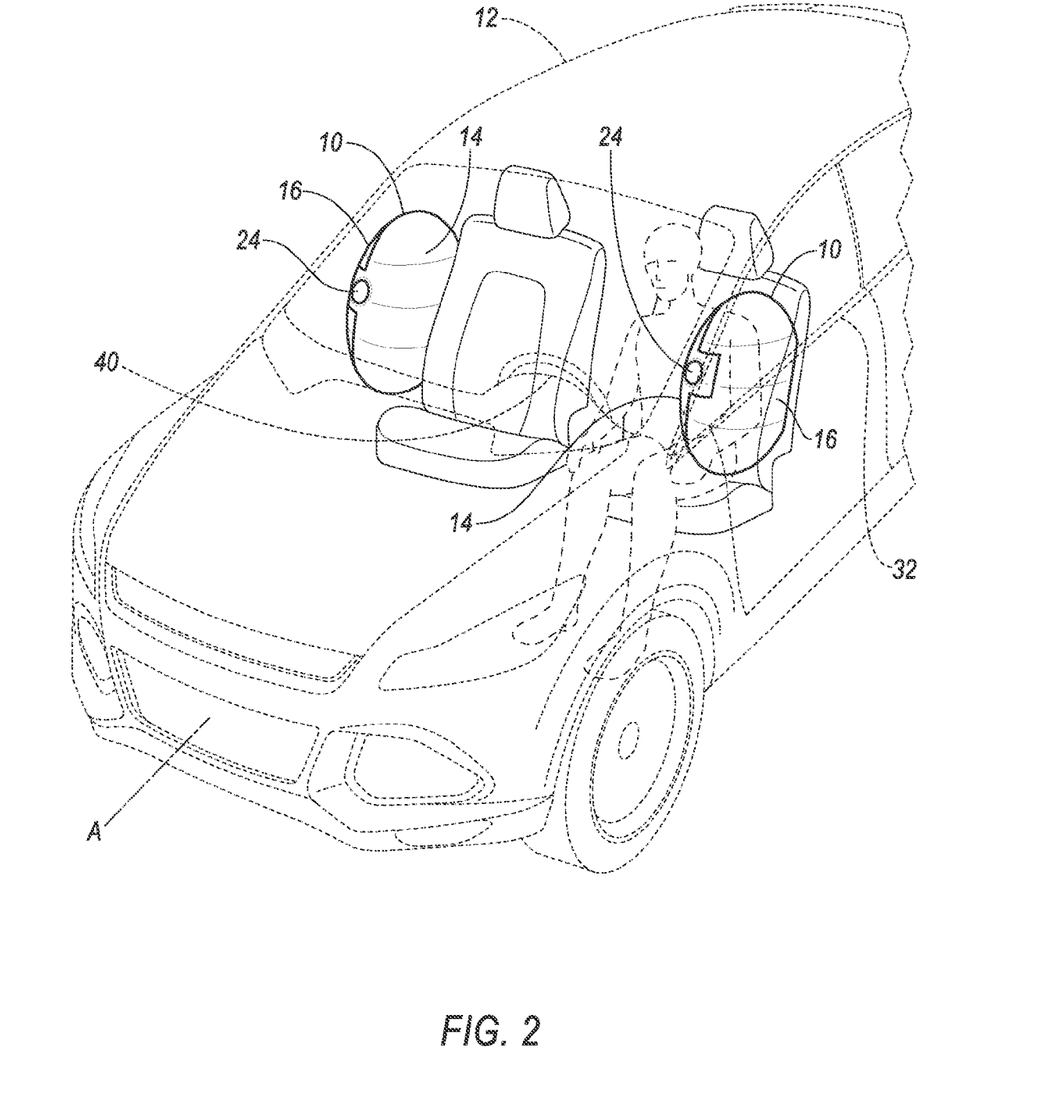
FIG. 2 is a perspective view of the vehicle with the side airbags in an inflated position.

With reference to FIGS. 1 and 2, a seat back assembly 28 may include the airbag 10, 210, 310. Specifically, the seat back assembly 28 includes a seat back 30, and the airbag 10, 210, 310 is supported by the seat back 30. The airbag 10, 210, 310 is inflatable from an uninflated position, as shown in FIG. 1, to an inflated position, as shown in FIG. 2. With reference to FIG. 1, in the uninflated position, the airbag 10, 210, 310 may be folded in the seat back 30, e.g., behind upholstery such as a side bolster of the seat back 30. With reference to FIG. 2, when the airbag 10, 210, 310 is inflated during a vehicle 12 impact, the airbag 10, 210, 310 breaks through the upholstery and extends between an occupant and a door 32 of the vehicle 12 to absorb impact energy between the occupant and the door 32.

Figure 5:
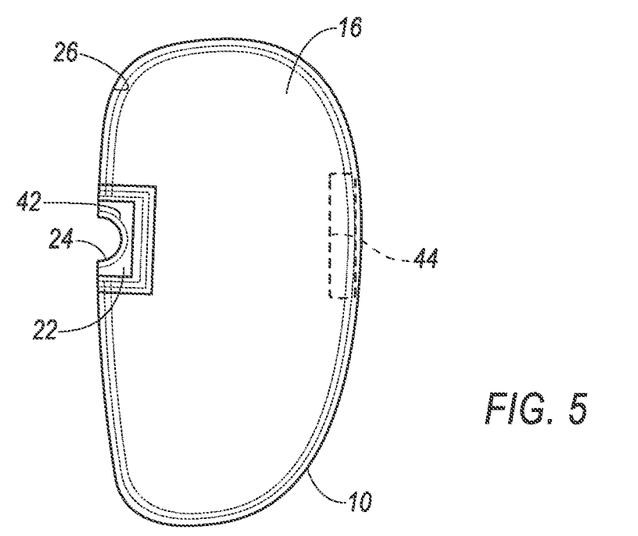
FIG. 5 is a side view of the side airbag in an uninflated position and an unfolded position.
Figure 6:
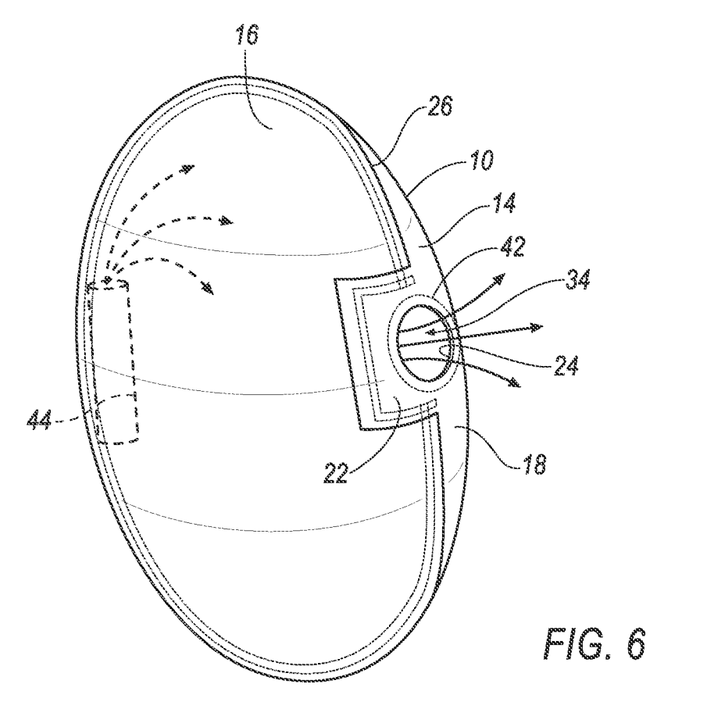
FIG. 6 is perspective view of the side airbag in the inflated position.
Figure 7:
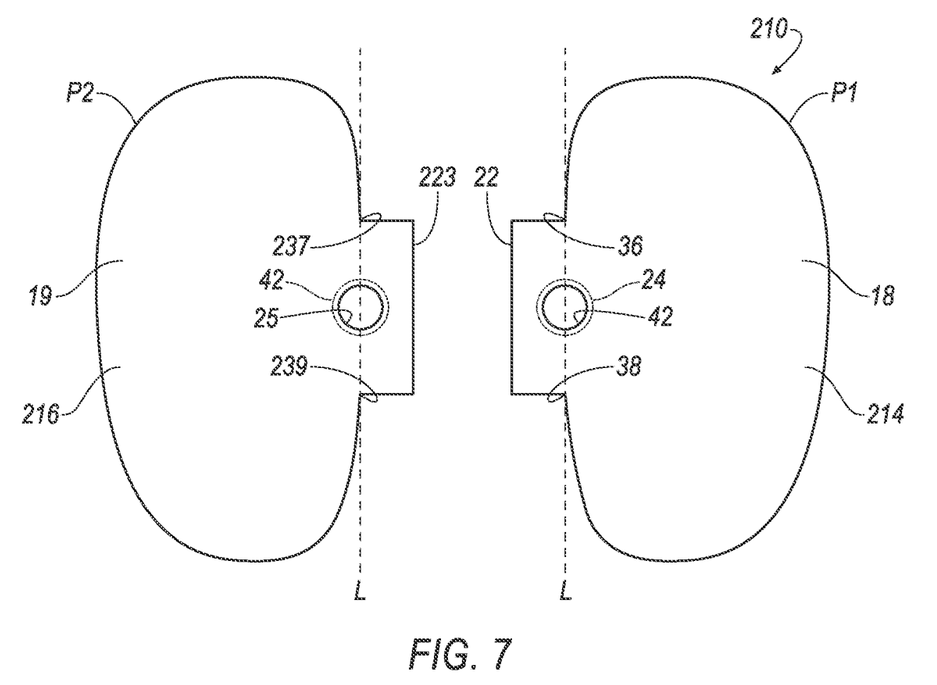
FIG. 7 is a front view of the first panel and second panel of a second embodiment of the side airbag.
Figure 8:
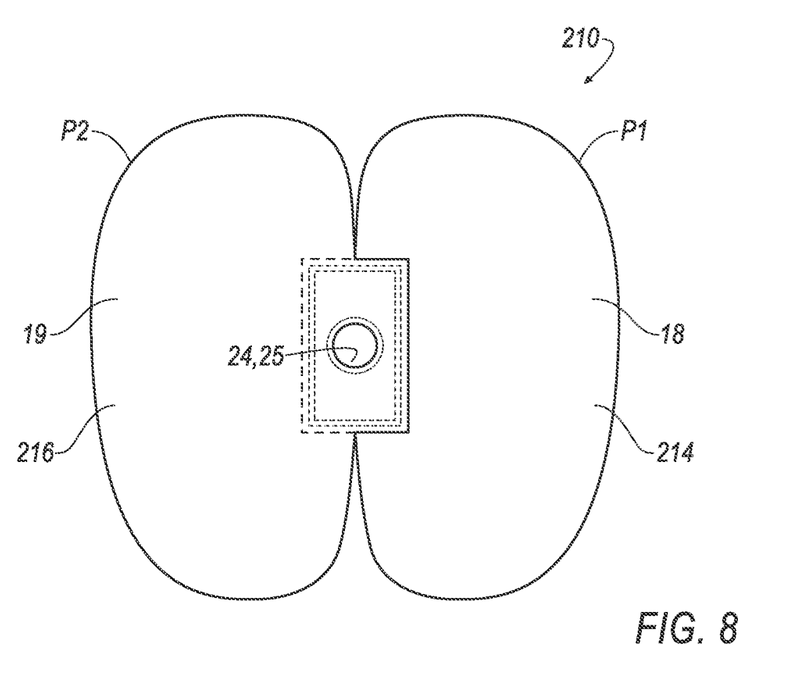
FIG. 8 is a front view of the second embodiment with a tab of the first panel connected to a tab of the second panel.
Figure 9:
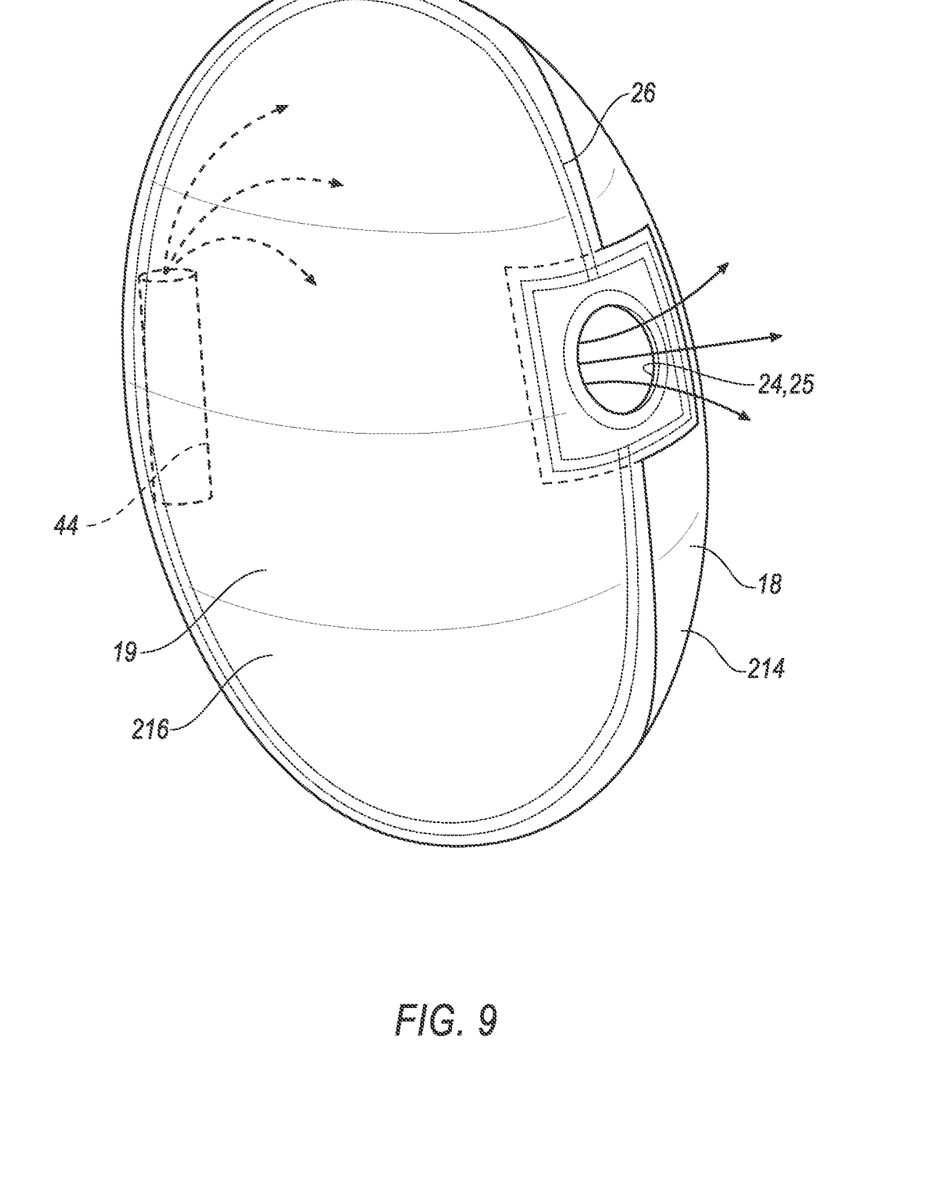
FIG. 9 is a perspective view of the second embodiment of the side airbag in the inflated position.
Figure 10:
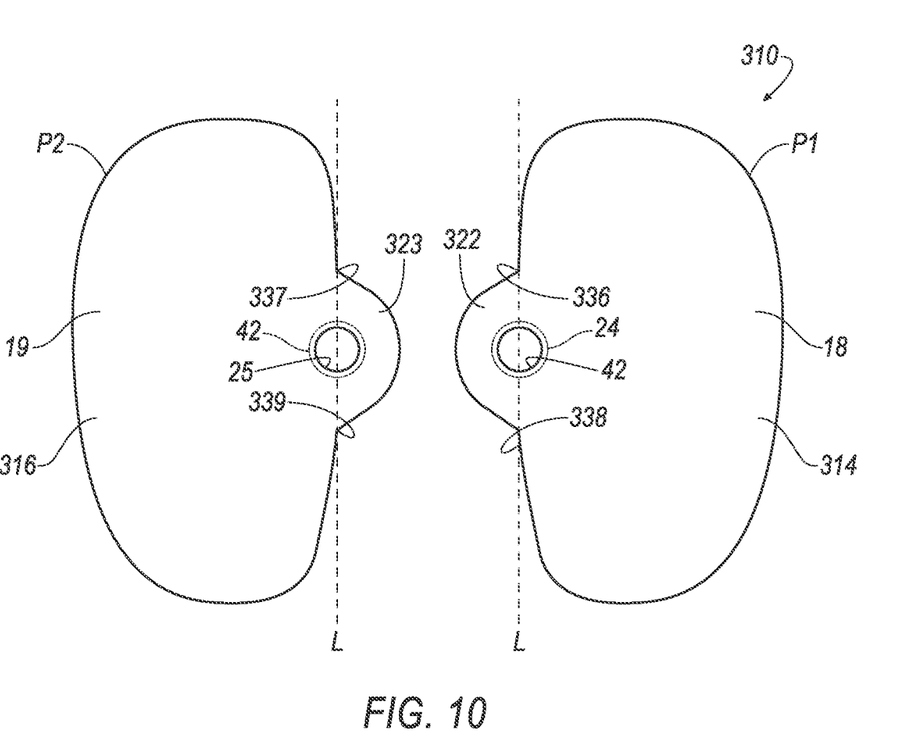
FIG. 10 is a front view of the first panel and second panel of a third embodiment of the side airbag.
Figure 11:
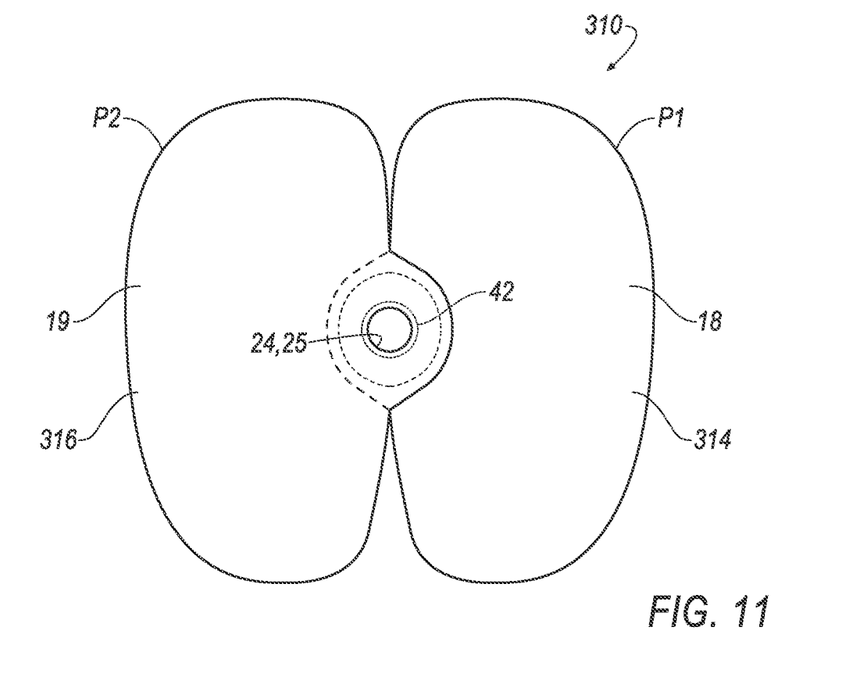
FIG. 11 is a front view of the third embodiment with a tab of the first panel connected to a tab of the second panel.
Figure 12:
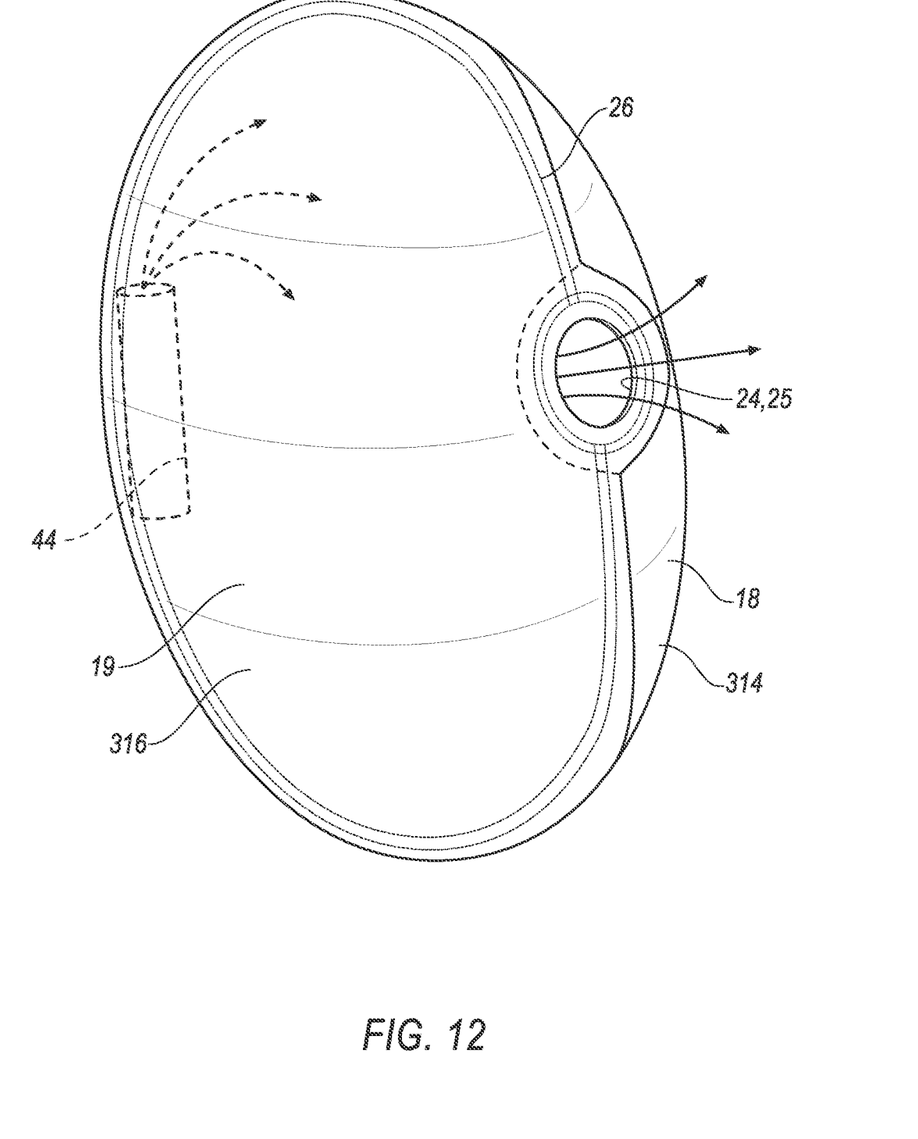
FIG. 12 is a perspective view of the third embodiment of the side airbag in the inflated position.

A first embodiment of the airbag 10 is shown in FIGS. 3-6, a second embodiment of the airbag 210 is shown in FIGS. 7-9, and a third embodiment of the airbag 310 is shown in FIGS. 10-12. As set forth further below, the first embodiment of the airbag 10 includes a cutout 20 on the second panel 16 and the tab 22 on the first panel 14 that overlaps the cutout 20. The second embodiment of the airbag 210 includes a tab 23 on the second panel 216 aligned with the tab 22 on the first panel 14. In the second embodiment of the airbag 210, the tabs 22, 23 are rectangular. The third embodiment of the airbag 310 includes the tabs 322, 323, which are arcuate.

With respect to the first embodiment of the airbag 10 shown in FIGS. 3-6, the first panel 14 and the second panel 16 are unsymmetrical, i.e., the first panel 14 includes the tab 22 and the second panel 16 includes the cutout 20. Specifically, the first panel 14 includes a main portion 18 and the tab 22 extends from the main portion 18. The second panel 16 includes a main portion 19 and the cutout 20 extends into the main portion.

Figure 3:
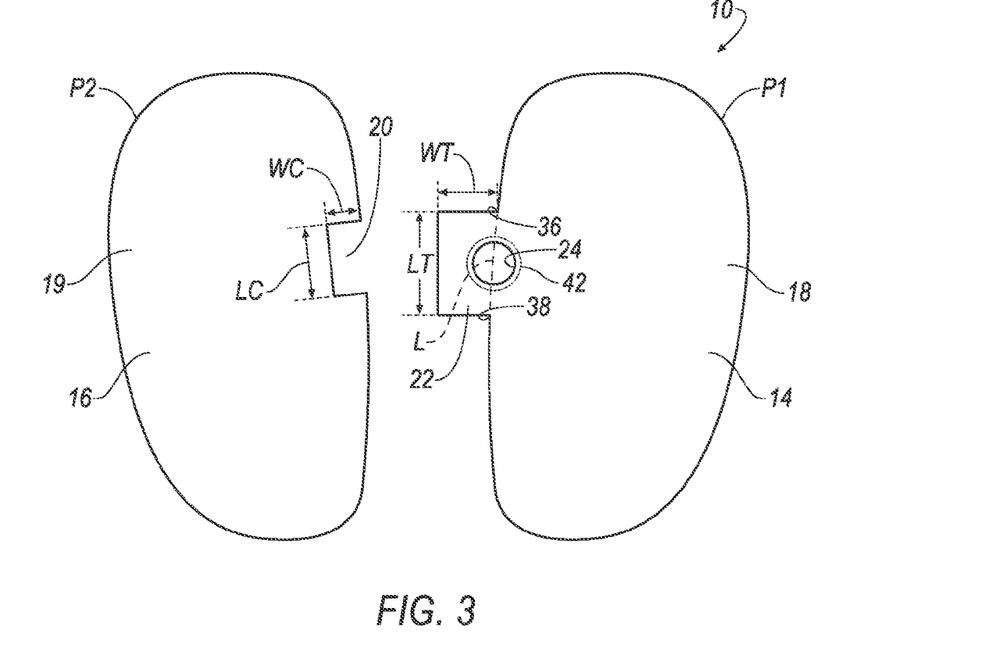
FIG. 3 is a front view of a first panel and a second panel of the side airbag.
Figure 4:
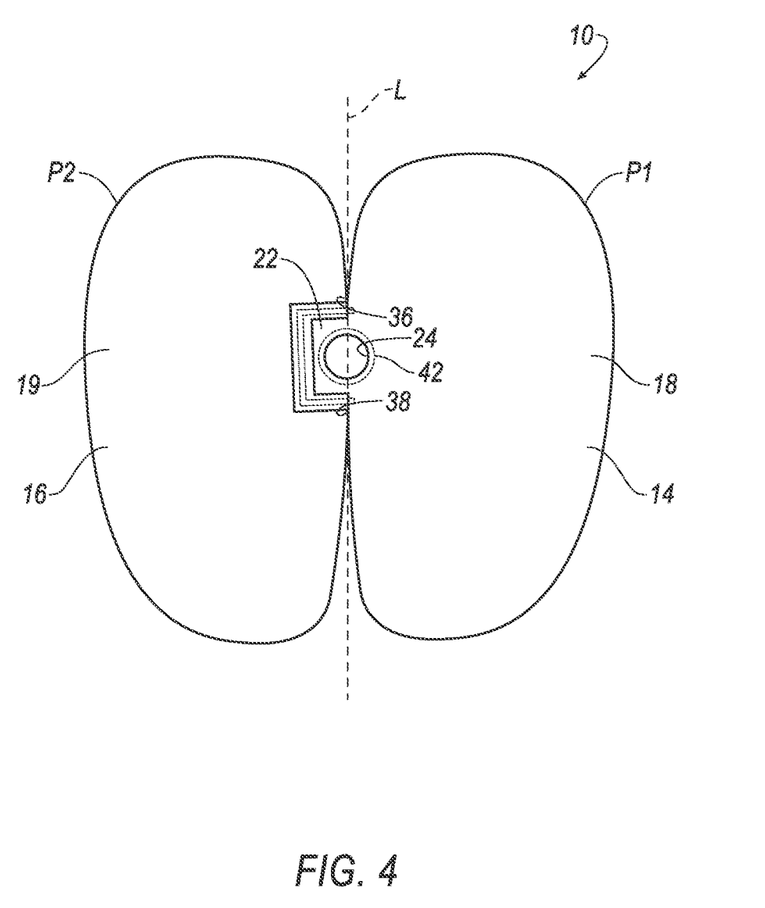
FIG. 4 is a front view of the first panel and second panel with a tab of the first panel connected to the second panel at a cutout of the second panel.

The tab 22 extends across the cutout 20. FIG. 3 shows the first panel 14 and the second panel 16 before assembly, and FIG. 4 shows the tab 22 connected to the second panel 16 at the cutout 20 before the perimeter P1 of the main portion 18 of the first panel 14 is connected to the second panel 16.

Figure 3A:
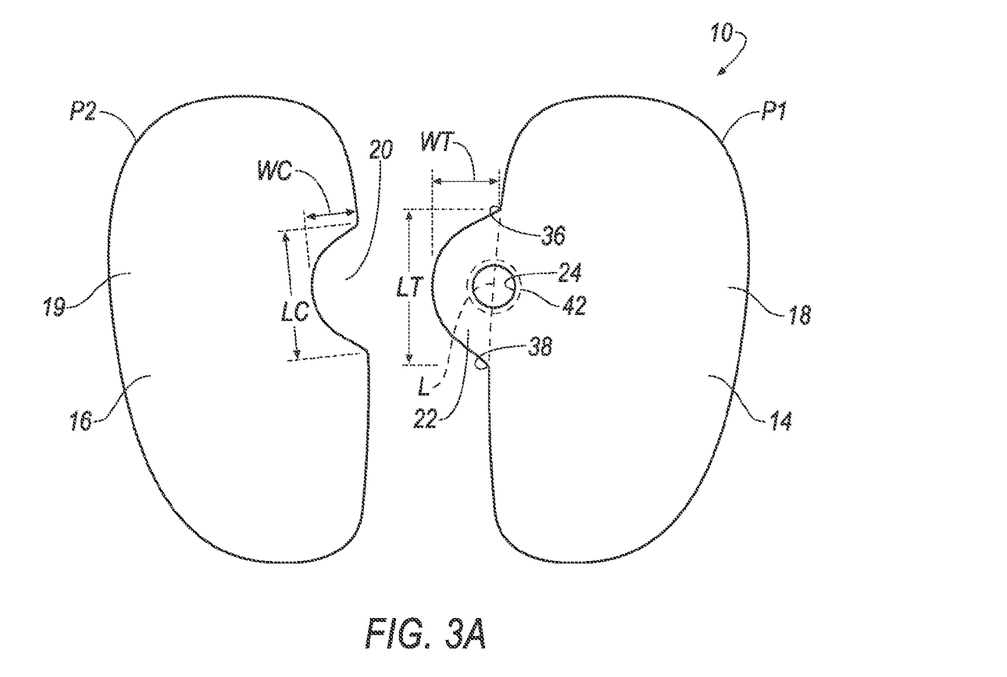
FIG. 3A is a front view of another configuration of the first panel and the second panel.

The tab 22 may have a shape corresponding to a shape of the cutout 20. For example, the tab 22 and the cutout 20 are rectangular in the Figures. Alternatively, the tab 22 and the cutout 20 may have any suitable shape, and may have the same shape or different shapes, such as, but not limited to, the arcuate shape shown in FIGS. 3A and 10.

The tab 22 is larger than the cutout 20 so that the tab 22 covers the cutout 20 when the first panel 14 and the second panel 16 are assembled together. For example, as shown in FIGS. 3 and 4, the length LT of the tab 22 is greater than the length LC of the cutout 20. Similarly, the width WT of the tab 22 is greater than the width WC of the cutout 20.

The tab 22 is connected to the second panel 16 at the cutout 20. Specifically, the tab 22 is connected to the second panel 16 along the cutout 20. With reference to FIGS. 5 and 6, the second panel 16 is connected to the first panel 14 along the seam 26. FIG. 5 shows the airbag 10 in an uninflated and unfolded position, and FIG. 6 shows the airbag 10 in an inflated position. The seam 26 extends along the perimeter P1 of the main portion 18 and along the tab 22 of the first panel 14, and along a perimeter P2 and the cutout 20 of the second panel 16.

With reference to FIGS. 3-6, the second panel 16, 216, 316 defines the cutout 20 at the seam 26, and the tab 22 of the first panel 14, 314 is at the seam 26. The tab 22 covers the cutout 20.

With continued reference to FIGS. 3-6, the tab 22 extends from a first end 36 to a second end 38. Specifically, the tab 22 extends from the perimeter P1 of the main portion 18 at the first end 36 of the tab 22 and at the second end 38 of the tab 22. As shown in the Figures, the first end 36 of the tab 22 and the second end 38 of the tab 22 extend transversely to the perimeter P1 of the main portion 18. The first end 36 and the second end 38 of the tab 22 may extend from the perimeter P1 of the main portion 18 at an angle, as shown in the Figures. Alternatively, the first end 36 and the second end 38 of the tab 22 may extend from the perimeter P1 of the main portion 18 at an arced transition. The tab 22 may be directly attached to the main portion 18 at the perimeter P1, or alternatively, may be attached to the main portion 18 at a position spaced from the perimeter P1 and may extend across the perimeter P1 to extend outwardly from the perimeter P1.

With continued reference to FIGS. 3-6, the vent 24 may extend at least partially to a portion of the main portion 18, as shown in the Figures. In other words, the vent 24 may straddle the tab 22 and the main portion 18. Alternatively, the vent 24 may be located entirely on the tab 22.

The vent may be disposed along a line extending through the first end and the second end. With reference to FIGS. 3 and 4, the vent 24 may be disposed along a line L extending through the first end 36 and the second end 38 of the tab 22. The vent 24 may be centered on the line L of the first panel 14, or alternatively may be offset, i.e., un-centered, relative to the line L of the first panel 14.

With reference to the second embodiment of the airbag 210 shown in FIGS. 7-9, the second panel 216 may include the tab 223. The tab 223 extends from the main portion 19 of the second panel 216. The tab 223 may be aligned with the tab 22 of the first panel 14 along the perimeter P1. The first panel 14 and the second panel 216 may be mirror images of each other or, alternatively, may have different shapes.

FIG. 7 shows the first panel 14 and the second panel 216 before assembly. FIG. 8 shows the tab 22 connected to the second panel 216 and shows the tab 223 connected to the first panel 14 before the perimeter P1 of the main portion 18 of the first panel 14 is connected to the second panel 216.

With reference to FIGS. 7-9, the tab 223 extends from a first end 237 to a second end 239. Specifically, the tab 223 extends from the perimeter P2 of the main portion 19 at the first end 237 of the tab 223 and at the second end 239 of the tab 223. The first end 237 of the tab 223 and the second end 239 of the tab 223 extend transversely to the perimeter P2 of the main portion 19. The first end 237 and the second end 239 of the tab 223 may extend from the perimeter P2 of the main portion 19 at an angle, as shown in the Figures.

Alternatively, the first end 237 and the second end 239 of the tab 223 may extend from the perimeter P2 of the main portion 19 at an arced transition. The tab 223 may be directly attached to the main portion 19 at the perimeter P2, or alternatively, may be attached to the main portion 19 at a position spaced from the perimeter P2 and may extend across the perimeter P2 to extend outwardly from the perimeter P2.

With reference to FIGS. 7-9, the tab 223 of the second panel 216 may define a vent 25 in communication with the vent 24 of the first panel 14. Specifically, the vent 24 and the vent 25 may overlap such that the inflation chamber 34 is in communication with atmosphere through the vent 24 and vent 25.

As shown in FIGS. 7 and 8, the vent 25 may extend at least partially into a portion of the main portion 19. In other words, the vent 25 may straddle the tab 223 and the main portion 19. Alternatively, the vent 25 may be located entirely on the tab 223.

With continued reference to FIGS. 7-9, the vent 24 may be disposed along a line L extending through the first end 36 and the second end 38 of the tab 22. The vent 24 may be centered on the line L of the second panel 216, or alternatively may be offset, i.e., un-centered, relative to the line L of the second panel 216.

With continued reference to FIGS. 7-9, the tab 22 and tab 223 may have identical shapes and sizes. Alternatively, the tab 22 and the tab 223 may have any suitable shape, and may have the same shape or different shapes.

With reference to FIG. 9, the tab 22 of the first panel 14 is connected to the second panel 216 and the tab 223 of the second panel 216 is connected to the first panel 14. Specifically, the seam 26 may extend along the tab 22 and the tab 223. The seam 26 extends along the perimeters P1, P2 of the main portions 18, 19, along the tab 22 of the first panel 14, and along the tab 223 of the second panel 216.

With reference to the third embodiment of the airbag 310 shown in FIGS. 10-12, the tab 322 and the tab 323 may be arcuate. Otherwise, the description of the tab 22 and the tab 223 described above may also be applicable to the tab 322 and 323.

The tab 22, 322 may folded along the line L of the first panel 14, 314 in the uninflated position, and the tab 223, 323 may be folded along the line L of the second panel 216, 316. For example the tab 22 may initially be folded along the line L as shown in FIG. 5, and subsequently folded further to the position shown in FIG. 1.

The first panel 14, 314 and the second panel 16, 216, 316 may be stitched to each other along seam 26. Alternatively, or in addition, the first panel 14, 314 and the second panel 16, 216, 316 may be connected along the seam 26 in any suitable fashion, e.g., adhesive, welding, etc. The seam 26 may be sealed to prevent 24 gas flow across the seam 26, i.e., to prevent 24 gas flow from an inflation chamber 34 defined by the first panel 14 and the second panel 16.

The first panel 14, 314 and the second panel 16, 216, 316 may be formed of the same type of material, or of different types of materials. The first panel 14, 314 and the second panel 16, 216, 316 may be formed of any suitable type of material, e.g., from a woven polymer. For example, the first panel 14, 314 and/or the second panel 16, 216, 316 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane.

The tab 22, 322 and tab 223, 323 may be integrally formed with the main portion 18 and the main portion 19, respectively, i.e., formed simultaneously as a single continuous unit. Alternatively, the tab 22, 322 and the main portion 18 may be formed separately and subsequently attached together, and/or the tab 223, 323 may be formed separately and subsequently attached together.

As best shown in FIG. 2, the vent 24 is forward facing in the inflated position. In other words, the vehicle 12 extends along a longitudinal axis A, when the airbag 10, 210, 310 is in the inflated position, the vent 24 faces in a vehicle-forward direction along the longitudinal axis A. Specifically, with continued reference to FIG. 2, the vent 24 faces an instrument panel 40 of the vehicle 12 between the occupant and the door 32 in the inflated position. As shown in FIGS. 6, 9, and 12, the vent 24, 25 is spaced from the seam 26.

The vent 24, 25 may be reinforced to assist in maintaining the shape and integrity of the vent 24, 25 during inflation of the airbag 10, 210, 310. For example, the vent 24, 25 may include a stitch 42 around the vent 24, 25, as shown in the Figures. As one example, in the second and third embodiments, the tab 22, 322 and tab 223, 323 may be connected to each other, e.g., stitched, around the vents 24, 25 such that the vents 24, 25 operate as a single vent. Alternatively, or in addition, the vent 24, 25 may include a patch reinforcement (not shown) connected to the tab 22, 322, 223, 323 around the vent 24, 25. The vent 24, 25 may be circular, as shown in the Figures. Alternatively, the vent 24, 25 may be of any suitable shape.

The vent 24, 25 may include a break-away flap (not shown). For example, the flap may be configured to cover the vent 24, 25 to restrict or prevent gas flow through the vent 24, 25 at pressures in the inflation chamber 34 below a predetermined pressure. The flap may also be configured to open to allow gas flow through the vent 24, 25 at pressures in the inflation chamber 34 above a predetermined pressure. For example, the flap may include stitching configured to break in response to pressure in the inflation chamber 34 exceeding the predetermined pressure. As another example, the flap may include a tether configured to break or to lengthen in response to pressure in the inflation chamber 34 exceeding the predetermined pressure.

As shown in FIG. 6, the vent 24, 25 allows gas to exit the airbag 10, 210, 310 in the inflated position. The vent 24, 25 may be tuned to allow suitable venting of the airbag 10, 210, 310 to provide desired impact absorbing characteristics of the airbag 10, 210, 310. Specifically, tunable parameters of the vent 24, 25 include the size of the vent 24, 25, the shape of the vent 24, 25, and the location of the vent 24, 25 along the two axes X, Y. The designed size and shape of the vent 24, 25 may be varied, and the size and shape of the vent 24, 25 is maintained when the airbag 10, 210, 310 is in the inflated position.

The airbag 10, 210, 310 may include an inflator 44 in communication with the inflation chamber 34. The inflator 44 may be disposed in the inflation chamber 34, as shown in FIGS. 5, 6, 9 and 12, or may be disposed exterior to the inflation chamber 34.

The inflator 44 is in communication with the inflation chamber 34 to expand the inflation chamber 34 with an inflation medium, such as a gas. The inflator 44 may be, for example, a pyrotechnic inflator 44 that uses a chemical reaction to drive inflation medium to the inflation chamber 34. The inflator 44 may be of any suitable type, for example, a cold-gas inflator 44.

An exemplary progression of the assembly of the airbag 10 is shown in FIGS. 3-5. As shown in FIG. 3, the first panel 14 and the second panel 16 may be separately formed with the first panel 14 including the main portion 18 and the tab 22, and with the second panel 16 defining the cutout 20. As shown in FIG. 4, the tab 22 may be disposed over the cutout 20 and stitched to the second panel 16 along the cutout 20. As shown in FIG. 5, the tab 22 may then be folded about the line L and the perimeter P1 of the main portion 18 of the first panel 14 is stitched to the perimeter P2 of the second panel 16. The inflator 44 may be disposed between the first panel 14 and the second panel 16 before the perimeter P1 of the main portion 18 of the first panel 14 is stitched to the perimeter P2 of the second panel 16. The second and third embodiments of the airbag 210, 310 may be assembled in a similar progression.

Figure 13:
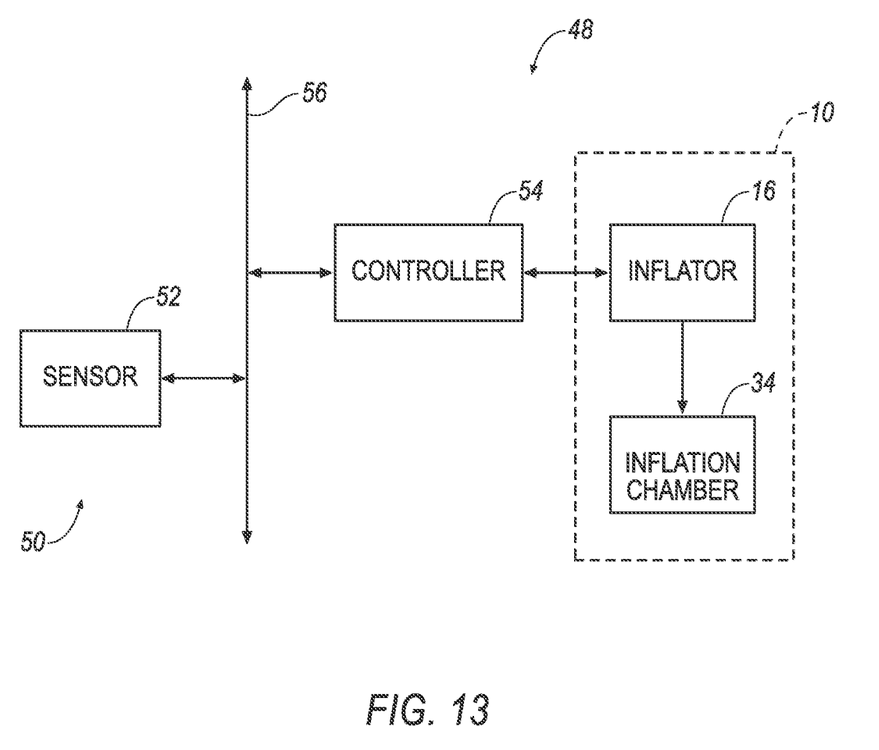
FIG. 13 is a schematic of an airbag system.

The airbag 10, 210, 310 may be a component of an airbag system 48, i.e., a passive restraint system, which is shown schematically in FIG. 13. The airbag system 48 includes an impact sensing system 50, which may include at least one impact sensor 52 for sensing impact of the vehicle 12. The impact sensor 52 is the only component of the impact sensing system 50 shown in FIG. 13, however, it should be appreciated that the impact sensing system 50 may include additional components not shown in FIG. 13.

The airbag system 48 may include a controller 54. The controller 54 and the sensor 52 may be connected to a communication bus 56, such as a controller area network (CAN) bus, of the vehicle 12. The controller 54 may use information from the communication bus 56 to control the activation of the inflator 44. The inflator 44 may be connected to the controller 54, as shown in FIG. 13, or may be connected directly to the communication bus 56.

The controller 54 may be in communication with the sensor 52 and the inflator 44, directly or through the communication bus 56, for activating the inflator 44, e.g., for providing an impulse to a pyrotechnic charge of the inflator 44, when the sensor 52 senses an impact of the vehicle 12. Alternatively or additionally to sensing impact, the impact sensing system 50 may be configured to sense impact prior to impact, i.e., pre-impact sensing. The sensor 52 may be of any suitable type, e.g., using radar, lidar, and/or a vision system. The vision system may include one or more cameras, CCD image sensors, and/or CMOS image sensor 52, etc.

The controller 54 may be a microprocessor-based controller. The sensor 52 is in communication with the controller 54 to communicate data to the controller. Based on the data communicated by the sensor 52, the controller instructs the inflator 44 to activate.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag comprising:
   a first panel having a perimeter;
   a second panel connected to the first panel along the perimeter of the first panel defining an inflation chamber between the first and second panels;
   the first panel having a tab extending from and transverse to the perimeter of the first panel, the tab being connected to the second panel;
   wherein the second panel is connected to the first panel along a seam extending along the perimeter of the first panel and along the tab, and wherein the second panel defines a cutout at the seam, the tab being connected to the second panel along the cutout;

wherein the tab and the cutout are both arcuate and have the same shape, and wherein the tab extends from the perimeter at an arced transition; and a vent on the tab in communication with the inflation chamber, wherein the vent is spaced from the seam.

2. The airbag as set forth in claim 1, wherein the tab includes a first end and a second end and extends from the perimeter of the first panel at the first end and the second end, wherein the vent is disposed along a line extending through the first end and the second end.

3. The airbag as set forth in claim 2, wherein the tab is folded along the line.

4. The airbag as set forth in claim 1, wherein the vent is circular.

5. The airbag as set forth in claim 1 further comprising an inflator in communication with the inflation chamber.

6. The airbag as set forth in claim 1, wherein the tab is larger than the cutout.

7. The airbag as set forth in claim 1, wherein the tab includes a first end and a second end and extends from the perimeter of the first panel at the first end and the second end, and wherein the tab includes an edge that extends from the first end and the second end, and the vent is spaced from the edge.

8. A seat back assembly comprising:

a seat back;

a side air bag supported by the seat back and including a first panel having a perimeter and a second panel connected to the first panel along the perimeter;

the first panel having a tab extending from the perimeter transverse to the perimeter, the tab being connected to the second panel; and wherein the second panel is connected to the first panel along a seam extending along the perimeter of the first panel and along the tab, and wherein the second panel defines a cutout at the seam, the tab being connected to the second panel along the cutout;

wherein the tab and the cutout are both arcuate and have the same shape, and wherein the tab extends from the perimeter at an arced transition;

a vent on the tab, wherein the vent is spaced from the seam.

9. The airbag as set forth in claim 8, wherein the tab includes a first end and a second end and extends from the perimeter of the first panel at the first end and the second end, wherein the vent is disposed along a line extending through the first end and the second end.

* * * * *